Aug. 6, 1929.    D. A. PRITCHARD ET AL    1,723,300
METHOD OF OBTAINING PURE CHLORINE
Filed March 31, 1925

INVENTORS
DAVID A. PRITCHARD
JESSE HUBEL
BY Fetherstonhaugh & Co
ATTORNEYS

Patented Aug. 6, 1929.

1,723,300

UNITED STATES PATENT OFFICE.

DAVID A. PRITCHARD, OF WINDSOR, ONTARIO, AND JESSE H. HUBEL, OF SANDWICH, ONTARIO, CANADA, ASSIGNORS TO CANADIAN INDUSTRIES LIMITED, OF MONTREAL, CANADA.

METHOD OF OBTAINING PURE CHLORINE.

Application filed March 31, 1925. Serial No. 19,676.

This invention relates to a new and useful method of obtaining pure chlorine from a mixture of gases containing chlorine and especially concerns the separation of pure high strength chlorine gas from the residual gas of liquid chlorine plants, which residual gas, owing to its high proportion of impurities, cannot be economically separated in the types of chlorine liquefying apparatus at present in use.

This invention will be described for the separation of chlorine from these certain residual gases of liquid chlorine plants, but it must be understood that the method and principles involved are applicable to the separation of other gases from a mixture of gases including chlorine.

From the chemical and physical properties of chlorine, it is realized that pure chlorine gas can be readily liquefied, yet chlorine obtained for commercial purposes by any of the processes up to the present is by no means pure, even if manufactured by the more modern electro-chemical methods, the gaseous impurities contained may be as high as 10%. Chlorine gas is supplied to commerce, for economic reasons, in the form of liquid chlorine. This necessitates the liquefaction of the chlorine and it is in the various liquefaction processes that the presence of impurities in the original gas prevents its complete liquefaction. This can be understood from Dalton's law from which it can be deduced that the percentage of liquefiable gases depends upon the amount of impurities present and is a maximum when the total pressure of the gas to be liquefied is large and the vapor pressure is decreased by low temperatures. For economic and mechanical reasons there are commercial limits to high pressures and increased refrigeration. This accounts for the residual gases of liquid chlorine processes in which the percentage of impurities is greatly increased due to partial liquefaction usually equal to as much as 50% of their volumetric content. It is the present practice to use these residual gases for the manufacture of bleaching powder or hydrochloric acid in which form the chlorine is less valuable than when in the free state and in a concentrated condition.

The main object of the invention is to accomplish a material economy by obtaining the gaseous chlorine existing in the residual gases from a liquid chlorine process as a pure, strong gas that can be readily liquefied by the same or other liquid chlorine processes.

Briefly, our invention consists in mixing the cold residual gases from a liquid chlorine process with refrigerated brine, water or solution of other suitable soluble salts in a refrigerating chamber or other suitable apparatus, under such conditions that there is a maximum production of crystals of chlorine hydrate. By mechanical or other means the crystals are removed from this refrigeration chamber and decomposed so that pure chlorine of high strength can be allowed to pass back into the liquid chlorine process.

It is well known that chlorine hydrate is formed at a temperature of between 0° C. and 3° C. so it is, obviously, necessary to carry out this reaction at a temperature of, or below, 3° C. Chlorine hydrate is a definite chemical compound having the formula $Cl_2.10H_2O$ of which 28.3% is chlorine and 71.7% is water. When heated at atmospheric pressure to a temperature of 9.6° C. or higher, chlorine hydrate decomposes into pure (100%) chlorine gas and water.

In the accompanying drawing we have shown suitable types of apparatus which may be employed in our method of treating the residual gases from chlorine liquefying plants.

Figures 1, 2:
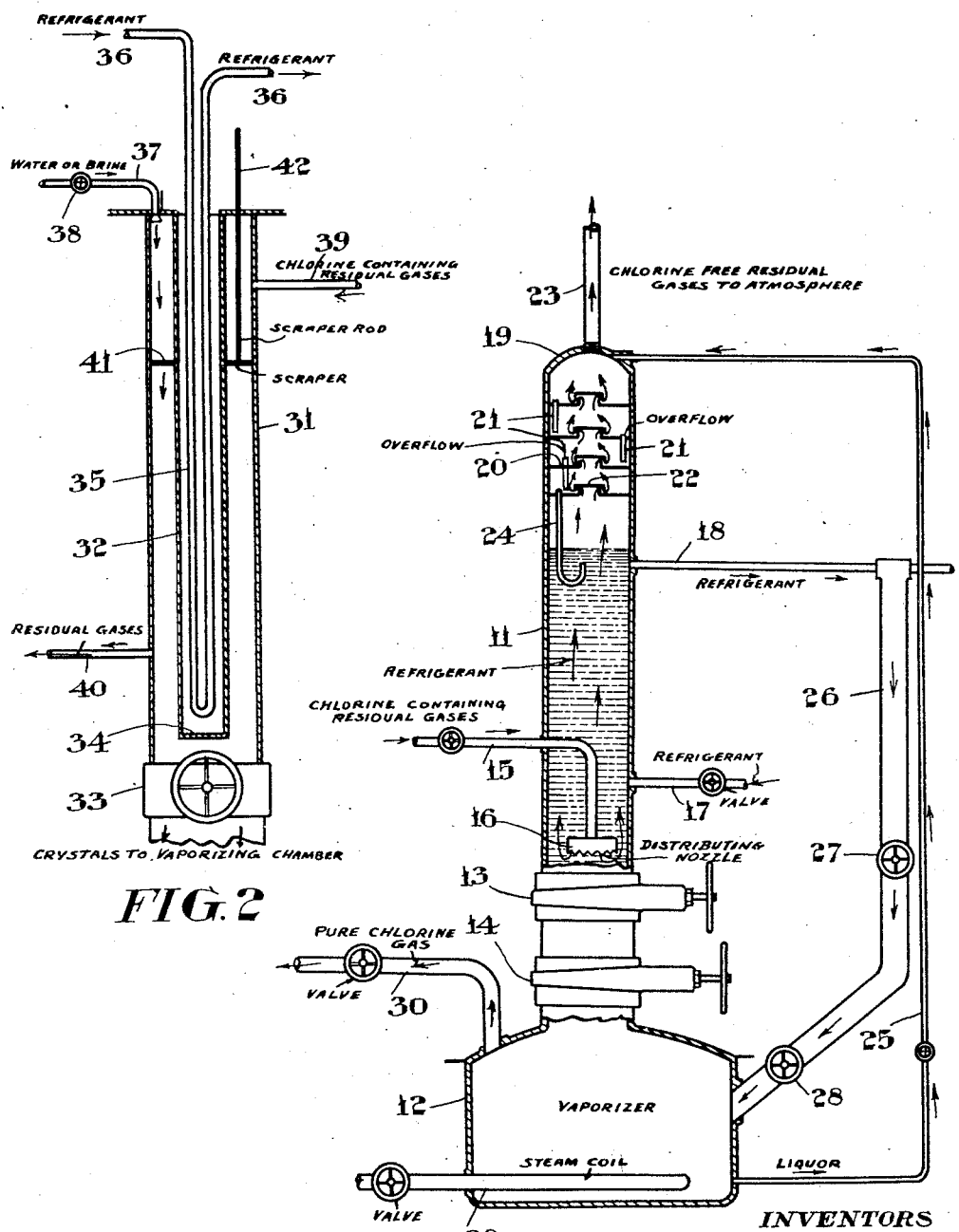
Figure 1 is a diagrammatic illustration of one form of apparatus which may be used.
Figure 2 is a diagrammatic illustration of a modified form of apparatus which may also be used.

Referring more particularly to the drawings, and particularly to Figure 1, 11 designates a vessel of cylindrical formation extending upwardly from a vaporizing tank 12 and provided with gate valves 13 and 14 spaced from one another in the vessel in close proximity to the upper part of the vaporizer. The residual gases from the liquefying process (not shown) are fed into the vessel 11 through the pipe 15 which is provided with a distributing nozzle 16 positioned near the valve 13. A refrigerant say water at 0° to 3° C., or refrigerated brine at the same or lower temperature, is fed into the vessel through the inlet pipe 17 positioned near the upper valve 13, and an outlet pipe 18 is provided for said refrigerant, said pipe 18 being positioned near the upper end 19 of the vessel, but spaced therefrom. In the space between the upper end of the vessel and the top of the refrigerant, which is approximately level with the outlet pipe 18, a plurality of pans 20 are secured to the inner wall of the vessel, said pans being provided with overflow pipes 21 and hooded conducting pipes 22. A discharge pipe 23 projecting upwardly from the upper end of the vessel is provided to allow the gases, from which the chlorine has been abstracted, to pass therethrough for atmospheric distribution. An overflow pipe 24 depends from the underside of the lowermost pan with the lowermost end of the pipe below the level of the refrigerant. A liquor feed pipe 25 to the pans is connected between the bottom of the vaporizer and the upper end of the vessel 11. A connection is made between the refrigerant discharge pipe and the vaporizer by means of the pipe 26 which is provided with a pair of valves 27 and 28 spaced from one another in the pipe line. The chloride hydrate in the vaporizer is heated to at least 9.6° C., by means of the steam coil 29 and the vaporized chlorine in the form of gas is discharged through the pipe 30 which may lead to the liquefying apparatus (not shown).

In the simplified form shown in Figure 2 an outer chamber 31 is provided and depending from its upper end is the inner chamber 32. A gate valve 33 is provided in the outer chamber below the lower end 34 of the inner chamber and through this valve the chlorine crystals pass to the vaporizing chamber, (not shown). Positioned within the inner chamber is the U shaped pipe 35 through which a refrigerant is adapted to flow in the direction indicated by the arrows 36. Water brine, or aqueous solutions of suitable salts are fed into the space between the shells of the chambers through the pipe or atomizer 37, which is connected to the shell at its upper end and is provided with a control valve 38. The residual gases containing chlorine are fed into the outer chamber through the pipe 39 positioned near the upper end of the said chamber and said gases pass out of the chamber through the pipe 40, which is positioned near the upper side of the gate valve, after the chlorine has been abstracted from the gases. A scraper 41 may be provided for cleaning the outer wall of the inner chamber and the inner wall of the outer chamber and may be operated through the medium of the operating rod 42. The crystals of chlorine hydrate may also be flushed out. It will be readily observed that, in the apparatus shown, the residual gases containing chlorine are brought into contact with means for reducing the temperature of said gases so that crystals of chlorine hydrate are formed and, by heating the chlorine hydrate, or raising the temperature a predetermined amount, said crystals decompose into pure chlorine gas and water. Figure 1 shows means for abstracting the crystals through the gate valves and also shows means for cleaning the discharged gases, by which they are freed from chlorine and which pass out through the upper end of the chamber.

It will be seen that by this invention relatively small percentages of chlorine contained in residual gases, or mixtures of gases, may be caused to react with water or aqueous solution of suitable salts at suitable temperatures to produce chlorine hydrate from which a pure chlorine gas may be obtained which may be dried and liquefied in my chlorine liquefying system.

From the foregoing it will be clearly understood that a desirable result is accomplished by the use of this method, which is more economical than has been possible heretofore. The apparatus shown is for illustrative purposes only and, so far as its details are concerned, many changes may be made or introduced by those skilled in the art without departing from the spirit of the invention or sacrificing the advantages enumerated therein.

Having thus described our invention, what we claim is:—

In the process of separating chlorine from a gas mixture containing the same, the herein described improvement which comprises bringing such gas mixture into contact with liquid refrigerated aqueous material in excess, at a temperature low enough to directly convert substantially the whole of said chlorine into chlorine hydrate and thereafter warming such chlorine hydrate sufficiently to vaporize and gasify the chlorine content thereof.

In witness whereof, we have hereunto set our hands.

DAVID A. PRITCHARD.
JESSE H. HUBEL.